US008073158B2

(12) United States Patent
Liu et al.

(10) Patent No.: US 8,073,158 B2
(45) Date of Patent: Dec. 6, 2011

(54) CIRCUIT FOR ELIMINATING NOISE

(75) Inventors: Bai-Hong Liu, Shenzhen (CN); Kun-Peng Li, Shenzhen (CN)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1274 days.

(21) Appl. No.: 11/733,213

(22) Filed: Apr. 10, 2007

(65) Prior Publication Data

US 2008/0159562 A1 Jul. 3, 2008

(30) Foreign Application Priority Data

Dec. 29, 2006 (CN) .......................... 2006 1 0064606

(51) Int. Cl.
*H04B 15/00* (2006.01)

(52) U.S. Cl. ..................................... 381/94.5; 381/94.1

(58) Field of Classification Search ........ 381/94.1–94.5, 381/71.1–71.4, 106, 81, 104, 123; 731/300, 731/310, 340; 361/89; 700/94
See application file for complete search history.

(56) References Cited

U.S. PATENT DOCUMENTS

| | | | | |
|---|---|---|---|---|
| 5,151,942 | A * | 9/1992 | Sasaki | 381/94.5 |
| 5,740,453 | A * | 4/1998 | Lada, Jr. | 713/330 |
| 5,768,601 | A * | 6/1998 | Tran | 713/300 |
| 5,794,057 | A | 8/1998 | Lada, Jr. | |
| 6,041,416 | A | 3/2000 | Lada, Jr. | |
| 6,768,224 | B2 | 7/2004 | Shen et al. | |
| 6,904,373 | B2 | 6/2005 | Le et al. | |
| 2008/0151455 | A1* | 6/2008 | Ren | 361/89 |

* cited by examiner

*Primary Examiner* — Xu Mei
*Assistant Examiner* — Lun-See Lao
(74) *Attorney, Agent, or Firm* — Altis Law Group, Inc.

(57) ABSTRACT

A circuit for eliminating noise includes a sound card (30) with an audio signal output, a power supply (10) for providing working voltage to the sound card, a first transistor (Q1), a second transistor (Q2), and a third transistor (Q3). The power supply has a power good pin, a PSON# pin, and a standby voltage pin. During powering on time of the sound card, the power good pin is at low level and the second transistor is therefore turned on to ground the audio signal output so as to eliminate turn-on noise. During powering down time of the sound card, the PSON# pin turns from low to high level to turn on the third transistor before the audio power for providing working voltage to the sound card is powered down, thus the first transistor turns off, and the second transistor turns on to ground the audio signal output of the sound card so as to eliminate turn-off noise.

17 Claims, 4 Drawing Sheets

FIG. 1 <PRIOR ART>

CIRCUIT FOR ELIMINATING NOISE

BACKGROUND OF THE INVENTION

1. Field of The Invention

The present invention relates to circuits for eliminating noise, and more particularly to a circuit for eliminating popping sound when a computer is switched on and off.

2. Description of Related Art

In an audio system of a computer, at the time when the computer is turned on or off, a popping sound is emitted from a speaker. In order to prevent the popping sound, a conventional circuit for eliminating noise is provided as shown in FIG. 1. The noise elimination circuit includes a sound card for receiving a digital audio signal and transforming it to an analog audio signal; a power supply with a +5V voltage pin connected with the sound card for providing a working voltage thereto; and an N-channel-enhancement MOSFET Q with a gate connected with a PSON# kPower Supply ON) pin of the power supply, a drain connected to the +5V voltage pin of the power supply through a resistor R, and a source connected to ground. During powering down time, the PSON# pin of the power supply switches from low to high level. Thus, the MOSFET Q is turned on and rendered conductive. The +5V voltage pin for providing a working voltage to the sound card is connected to ground through the conductive MOSFET Q. The sound card does not work and generate any audio signal as without working voltage, thus the popping noise is nearly eliminated when powering off the power supply.

However, the circuit for eliminating noise doesn't completely eliminate the popping sound as electric charge stored in capacitors connected to the power supply is not discharged instantly when the computer is powered down and does nothing about the popping sound when the computer is powered up.

What is needed, therefore, is a circuit for completely eliminating turn-on and turn-off popping noise from a computer.

SUMMARY OF THE INVENTION

A circuit for eliminating noise includes a sound card with an audio signal output, a power supply for providing working voltage to the sound card, a first transistor, a second transistor, and a third transistor. The power supply has a power good pin, a PSON# pin, and a standby voltage pin. During powering time of the sound card, the power good pin is at low level and the second transistor is therefore turned on to ground the audio signal output so as to eliminate turn-on noise. During powering down time of the sound card, the PSON# pin turns from low to high level to turn on the third transistor before the audio power for providing working voltage to the sound card is powered down, thus the first transistor turns off, and the second transistor turns on to ground the audio signal output of the sound card so as to eliminate turn-off noise.

Other advantages and novel features will be drawn from the following detailed description of preferred embodiments with attached drawings, in which:

DETAILED DESCRIPTION OF THE INVENTION

Figure 1:
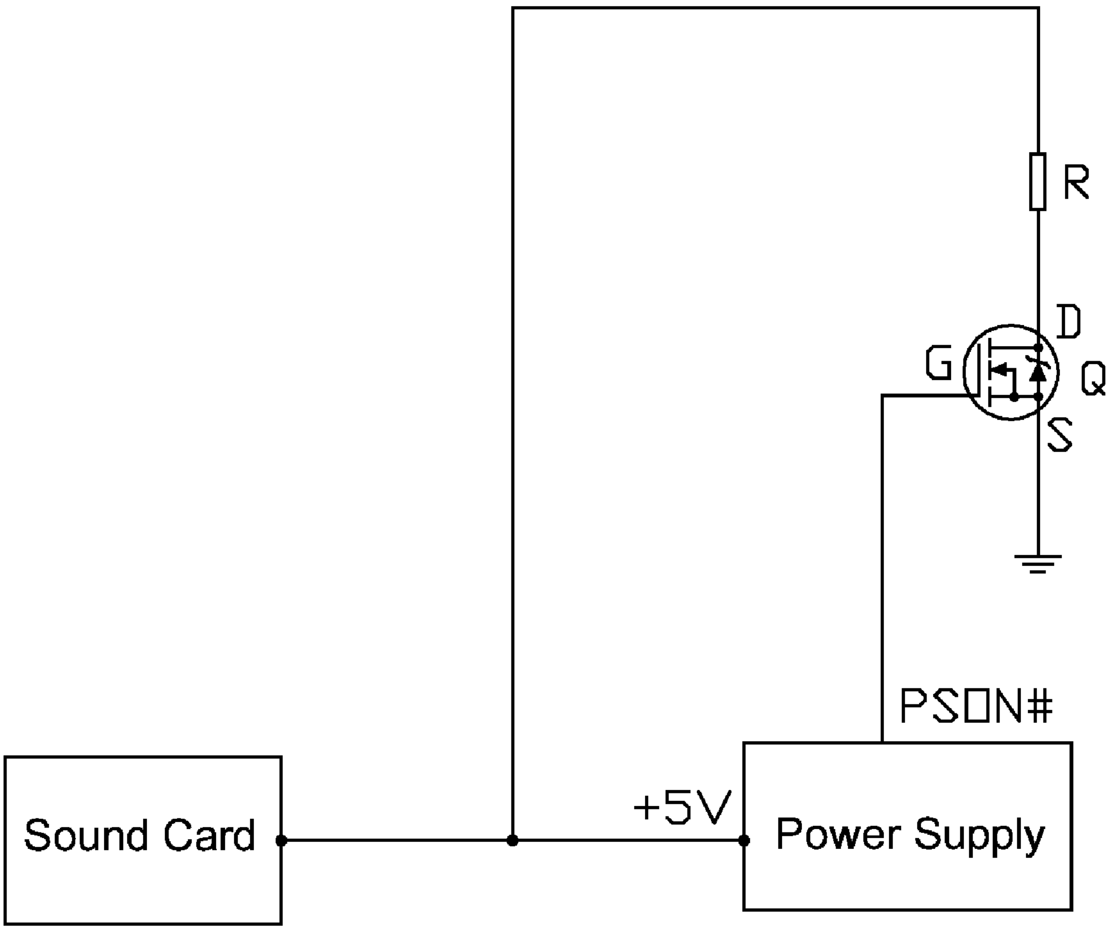
FIG. 1 is a conventional circuit for eliminating turn-off noise.
Figure 2:
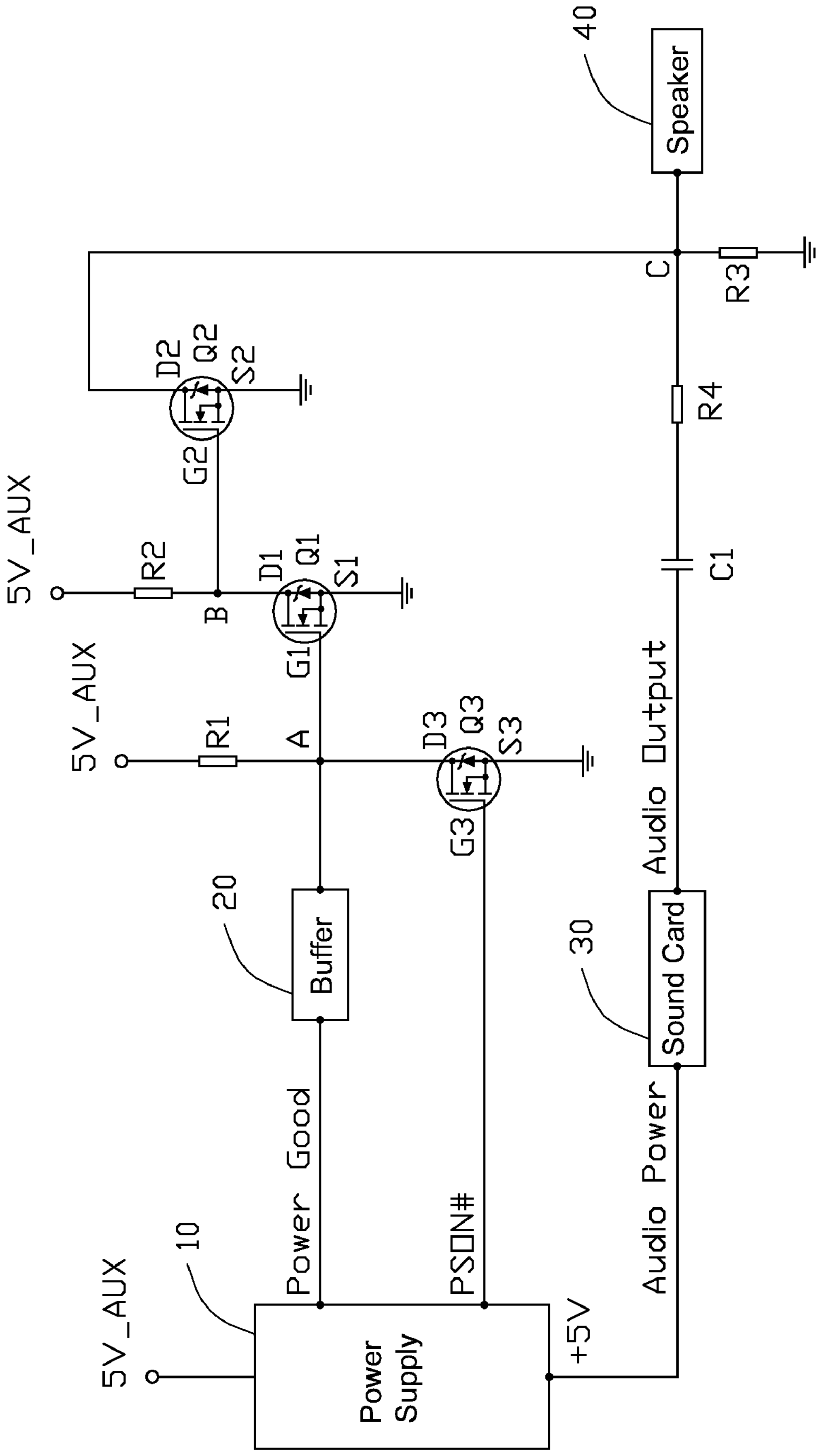
FIG. 2 is a circuit for eliminating noise in accordance with a preferred embodiment of the present invention, the circuit for eliminating noise includes a power supply, a buffer, a sound card, a speaker, a plurality of transistors etc.

Referring to FIG. 2, a circuit for eliminating noise of a preferred embodiment of the present invention comprises a power supply 10, a buffer 20, a sound card 30, a speaker 40, transistors Q1-Q3, resistors R1-R4, and a capacitor C1.

The power supply 10 has a power good pin, a PSON# pin, a 5V_AUX pin, and a +5V pin. The power good pin provides a power good signal, which switches from low to high level after 100 ms-500 ms delay when the PSON# pin is set from high to low level to turn on the power supply 10, and switches from high to low level after a delay time no less than 50 ms when the PSON# pin is set from low to high level to turn off the power supply 10. The PSON# pin delivers an active low PSON# signal to turn on or off the power supply 10. The +5V pin delivers +5V voltage signal after the power supply 10 is powered on. The 5V_AUX pin provides 5V standby voltage whether the power supply 10 is on or off.

The buffer 20 includes an input port connected with the power good pin of the power supply 10, and an output port connected with a node A which further connects to the 5V-AUX pin through the resistor R1.

The sound card 30 has an audio power pin connected to the +5V pin of the power supply 10, and an audio output pin for delivering audio signals to the speaker 40 through the capacitor C1 and the fourth resistor R4. One terminal of the fourth resistor R4 connects with the capacitor C1, another terminal of the fourth resistor R4 connects with a node C which is connected to ground terminal via the third resistor R3. The speaker 40 connects with the node C for playing the audio signals sent from the sound card 30.

The first transistor Q1 has a gate G1 connected with the node A, a drain D1 connected with a node B, and a source S1 connected to ground. The node B also connects to the 5V_AUX pin of the power supply 10 through the second resistor R2.

The second transistor Q2 has a gate G2 connected with the node B, a drain D2 connected with the node C, and a source S2 connected to ground.

The third transistor Q3 has a gate G3 connected to the PSON# pin of the power supply 10, a drain D3 connected with the node A, and a source S3 connected to ground.

Figure 3:
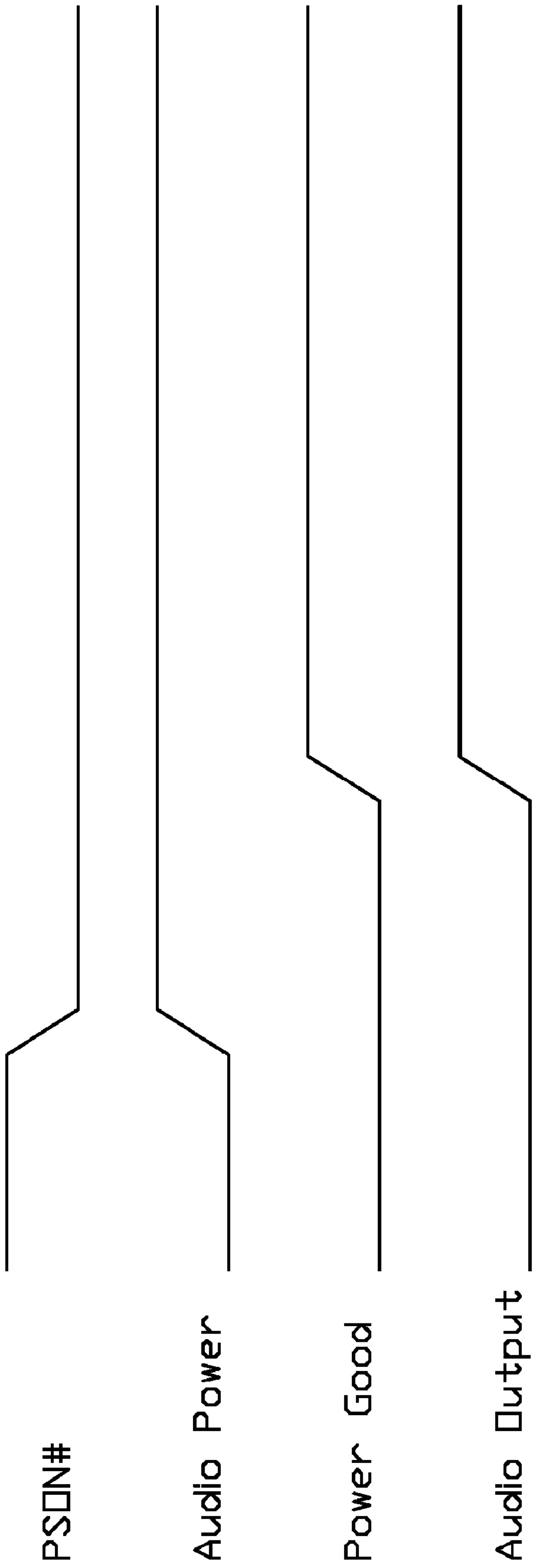
FIG. 3 is a time diagram of signals of the circuit for eliminating noise during powering on time.

Referring to FIGS. 2 and 3, during powering up time, the PSON# signal turns from high to low level to turn on the power supply 10; the audio power signal for the sound card 30 rises to high level instantly; the power good signal switches from low to high level later than the audio power signal switches from low to high level. During a time when the audio power is being powered up to high level before it reaches its steady state, the sound card 30 produces irregular audio signals. The power good signal is still low at the time when the audio power is being powered up, so the node A is at low level, and the transistor Q1 is rendered non-conductive. The node B is at high level to turn on the second transistor Q2. The node C connects to ground through the turned-on transistor Q2, so the irregular audio signals from the sound card 30 go to ground for muting the speaker 40 which does not emit a popping sound during the powering up time. After the power good signal goes to high level, the transistor Q1 is turned on and rendered conductive, and the transistor Q2 is turned off to disconnect the node C from its source which connects with ground, thus the speaker 40 plays the audio signal sent by the sound card 30 normally.

Figure 4:
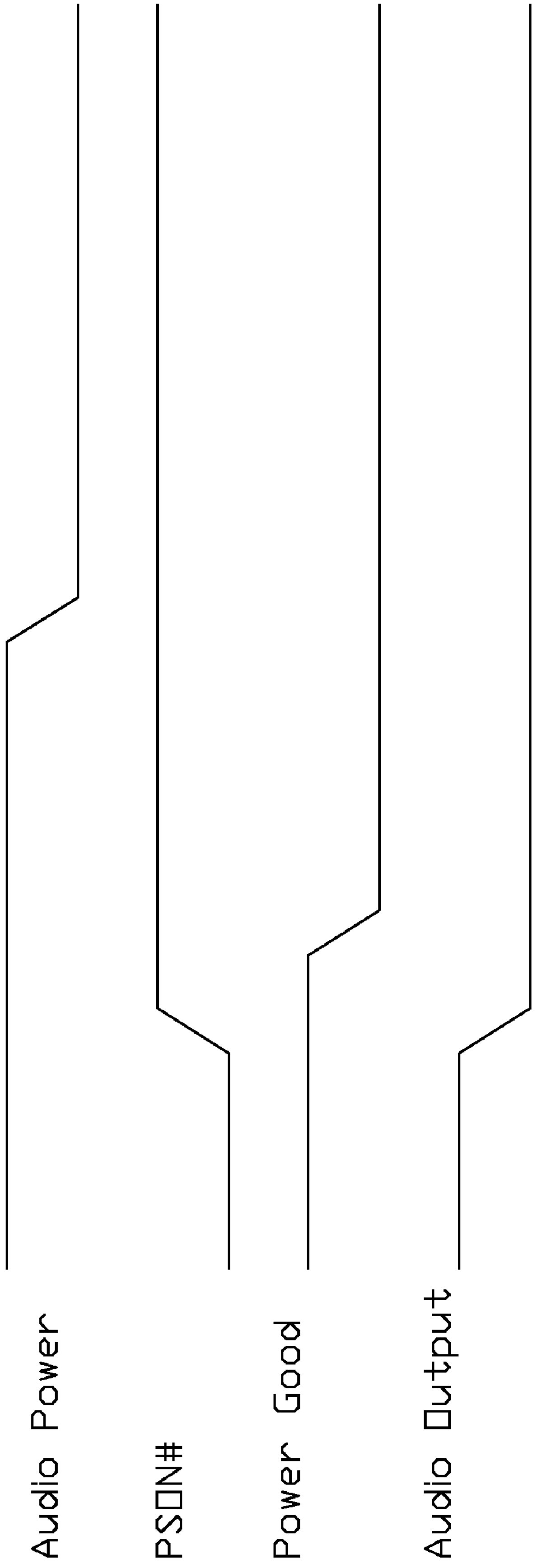
FIG. 4 is a time diagram of signals of the circuit for eliminating noise during powering off time.

Referring to FIGS. 2 and 4, during powering down time, the PSON# signal goes to high level to turn off the power supply, then the power good signal switches from high to low level, the audio power signal switches from high to low level later than the PSON# signal switches from low to high level since due to a turn-off delay time of a power rail applied to the sound card 30. During the audio power signal switching to low level before it reaches its steady state, the sound card 30 also produces irregular audio signals. However the transistor Q3 is turned on since the PSON# signal is at high level, thus the node A is enabled at low level, and the transistor Q1 is turned off. The node B is at high level, thus the transistor Q2 is turned on and connects the node C to ground at that time when the sound card 30 producing irregular audio signal. The irregular audio signals are connected to ground, thus the speaker 40 emits no turn-off popping sound during the powering down time.

During the powering down time, the buffer 20 isolates the power good signal from the node A so that the power good signal goes to low level later than the PSON# signal goes to high level as a normal time sequence when the power supply 10 is powered off.

As shown is FIG. 2, the first transistor Q1, the second transistor Q2, and the third transistor Q3 are N-channel-enhancement MOSEFTs; however other switching devices, such as P-channel MOSEFTs or N-channel or P-channel bipolar transistors could be employed.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for eliminating noise generated by a sound card which is supplied with an audio power, the circuit comprising:
- a first transistor with a first gate configured to receive a power good signal, a first drain connected to a standby voltage terminal, and a first source connected to ground;
- a second transistor with a second gate connected to the first drain of the first transistor, a second drain coupled with an audio signal output of the sound card, and a second source connected to ground;
- a third transistor with a third gate responsive to a power supply on (PSON#) signal, a third drain connected to the first gate of the first transistor, and a third source connected to ground;
- wherein the power good signal stays at low level during a time when the PSON# signal turns from high to low level in order that the audio power for providing working voltage to the sound card is powered up, thus the first transistor turns off, and the second transistor turns on to ground the audio signal output of the sound card during powering up time so as to eliminate turn-on noise; and
- wherein the PSON# signal turns from low to high level to turn on the third transistor before the audio power for providing working voltage to the sound card is powered down, thus the first transistor turns off, and the second transistor turns on to ground the audio signal output of the sound card during powering down time so as to eliminate turn-off noise.

2. The circuit for eliminating noise as described in claim 1, wherein the first, second, and third transistors are all N-channel-enhancement MOSEFTs.

3. The circuit for eliminating noise as described in claim 1, wherein the first gate further connects to the standby voltage terminal through a first resistor.

4. The circuit for eliminating noise as described in claim 3, wherein the first drain and the second gate connect to the standby voltage terminal through a second resistor.

5. The circuit for eliminating noise as described in claim 1, further comprising a buffer connected between the power good signal and the first gate.

6. A circuit for eliminating noise comprising:
- a sound card with an audio signal output;
- a power supply for providing audio power to the sound card having a power good pin and a standby voltage pin;
- a first and a second transistors, a gate of the first transistor connecting to the power good pin of the power supply, a drain of the first transistor connecting to a gate of the second transistor and the standby voltage pin of the power supply, a drain of the second transistor connecting with the audio signal output of the sound card, sources of the first transistor and the second transistor both connecting to ground; and wherein the power good pin is at low level during a time when the audio power to the sound card from the power supply is powered up, thus the first transistor is rendered non-conductive, the second transistor is turned on to ground the audio signal output so as to eliminate turn-on noise which is generated by the sound card during the time the audio power is being powered up.

7. The circuit for eliminating noise as described in claim 6, further comprising a third transistor, a gate of the third transistor connects to a power supply on (PSON#) pin of the power supply, a drain of the third transistor connects to the gate of the first transistor, a source of the third transistor connects to ground, wherein during the power supply is being turned down, a PSON# signal at the PSON# pin turns from low to high level to turn on the third transistor before the audio power to the sound card is powered down, thus the first transistor turns off, and the second transistor turns on to ground the audio signal output so as to eliminate turn-off noise.

8. The circuit for eliminating noise as described in claim 7, wherein the drain of the third transistor connects to the standby voltage pin of the power supply through a first resistor.

9. The circuit for eliminating noise as described in claim 7, wherein the first, second, and third transistors are all N-channel-enhancement MOSFETs.

10. The circuit for eliminating noise as described in claim 7, wherein the gate of the first transistor connects to the power good pin of the power supply through a buffer.

11. The circuit for eliminating noise as described in claim 6, wherein the drain of the first transistor and the gate of the second transistor connect to the standby voltage pin of the power supply through a second resistor.

12. A circuit for eliminating noise comprising:
- a sound card having an audio signal output;
- a power supply for providing audio power to the sound card, the power supply having a power good pin, a power supply on (PSON#) pin, and a standby voltage pin;
- a first electric switch, one end of the first electric switch connecting to a node which connects with the power good pin and the standby voltage pin, another end of the first electric switch connecting to the PSON# pin; and a second electric switch, one end of the second electric switch connecting to the node, another end of the second electric switch connecting to the audio signal output of the sound card;

wherein during a time when the audio power supplied to the sound card from the power supply is being powered up, the power good pin is at low level and thus the second electric switch is turned on to ground the audio signal output of the sound card so as to eliminate turn-on noise generated by the sound card during powering up time; and wherein during a time when the audio power supplied to the sound card from the power supply is being powered down, a PSON# signal at the PSON# pin turns from low to high level to turn on the first electric switch before the audio power supplied to the sound card from the power supply is powered down, thus the first electric switch turns on which results in the second electric switch being turned on to ground audio signal output of the sound card so as to eliminate turn-off noise generated by the sound card during powering down time.

13. The circuit as claimed in claim 12, further comprising a third electric switch connected between the node and the second electric switch.

14. The circuit as claimed in claim 13, wherein the first, second, and third electric switches are all transistors of which sources are connected to ground.

15. The circuit as claimed in claim 14, wherein a gate of the first electric switch is connected with the PSON# pin of the power supply, a drain of the first electric switch is connected with the node.

16. The circuit as claimed in claim 15, wherein a gate of the third electric switch is connected with the node, a drain of the third electric switch is connected with another node which connects to the standby voltage pin of the power supply and a gate of the second electric switch, a drain of the second electric switch is connected to the audio signal output of the sound card.

17. The circuit as claimed in claim 14, wherein the first, second, and third electric switches are all N-channel-enhancement MOSFETs.

* * * * *